United States Patent [19]

Cope et al.

[11] Patent Number: 4,639,337

[45] Date of Patent: Jan. 27, 1987

[54] PROCESS FOR SEPARATING SURFACTANTS FROM LIQUID USED IN THE MANUFACTURE OF CONCENTRATED FLUOROPOLYMER DISPERSIONS

[75] Inventors: Charles S. Cope, Parkersburg, W. Va.; Katsunosuke Kitagawa; Kazuo Konabe, both of Shimizu, Japan

[73] Assignee: E. I. Du Pont de Nemours and Company, Wilmington, Del.

[21] Appl. No.: 711,833

[22] Filed: Mar. 14, 1985

[51] Int. Cl.$^4$ .................... C11C 3/00; C07B 53/21
[52] U.S. Cl. .................................. 260/408; 562/605
[58] Field of Search ..................... 260/408; 562/605

[56] References Cited

U.S. PATENT DOCUMENTS 2,863,889 12/1958 Marks .................................. 260/408
2,948,741 8/1960 Barnhart et al. ..................... 260/408
4,282,162 8/1981 Kuhls .................................. 260/408

OTHER PUBLICATIONS

Kirk-Othmer, *Encyclopedia of Chemical Technology*, vol. 2, 1963, pp. 51–52.

*Primary Examiner*—Charles F. Warren
*Assistant Examiner*—Elizabeth A. Flaherty

[57] ABSTRACT

A process for separating the ammonium salt of a selected fluoroalkanoic acid and a selected hydrocarbyl oxyethoxylatedpolyether from aqueous dross liquor which comprises:

A. extracting the ammonium salt (in the form of its corresponding acid) and the ethoxylated compound from an acidified aqueous dross liquor by agitating with a selected organic liquid and separating the organic liquid layer, B. (1) contacting said organic liquid layer with activated alumina,
   (2) washing and drying the alumina and contacting it with ammonium hydroxide, C. boiling the organic liquid obtained in step B1 until the ethoxylated compound remains.

1 Claim, No Drawings

PROCESS FOR SEPARATING SURFACTANTS FROM LIQUID USED IN THE MANUFACTURE OF CONCENTRATED FLUOROPOLYMER DISPERSIONS

FIELD OF THE INVENTION

This invention concerns a process for the recovery of surfactants of both the nonionic and anionic types from an aqueous dross liquor produced during the so-called "thermal concentration" of polytetrafluoroethylene (PTFE) polymer raw dispersion to increase polymer content.

BACKGROUND OF THE INVENTION

The surfactants present in the aqueous dross liquor (usually called "supernate") can come from two sources. One source is the anionic surfactant or dispersant used during the polymerization of tetrafluoroethylene. This surfactant is an ammonium perfluoroalkanoate (called AMPFAk hereafter). A preferred surfactant of this type is ammonium perfluorooctanoate (AMPFO hereafter).

The second source is the surfactant used in concentrating the raw dispersion obtained from the polymerization. This surfactant is a nonionic one and is a hydrocarbyl oxyethoxylate. Subclasses are aliphatic alcohol ethoxylates and alkyl phenol ethoxylates. A preferred surfactant of this type is "Triton" X-100. These surfactants are sometimes generically called hydrocarbyl oxyethoxylated polyethers.

The raw dispersions are typically concentrated to 55–60 wt. % solids by a so-called "thermal concentration" process such as that described in U.S. Pat. No. 3,037,953. The raw dispersion, typically containing from 35 to 45 wt % solids, is charged to a jacketed vessel capable of being heated to temperatures below the boiling point of the dispersion. To the raw dispersion is added a nonionic surfactant of the hydrocarbyl oxyethoxylate type. Preferably, ammonium hydroxide is also added to render the dispersion alkaline (pH=9 to 11) to accelerate the thermal concentration process and to resist later bacterial "souring" of the concentrated dispersion product.

The contents of the vessel after mixing are then heated to a temperature somewhat above the cloud point of the surfactant, and allowed to stand (unagitated) at this temperature until separation into two liquid layers is essentially complete. The nearly clear supernatant layer (hereafter called "supernate") is then syphoned or decanted off, and the lower layer, consisting of a concentrated, colloidal dispersion of the polymer containing 55–60% solids by weight, is pumped to storage tanks from which it is withdrawn for subsequent packaging and commercial sale.

A preferred nonionic hydrocarbyl oxyethoxylated surfactant for use in the thermal concentration process is an alkyl phenol ethoxylate, namely, t-octylphenol ethoxylate containing, on average, from 9 to 10 ethylene oxide units per molecule. Such a surfactant is commercially available as "Triton" X-100, sold by the Rohm & Haas Company. A suitable nonionic surfactant of the aliphatic alcohol ethoxylate type is "Tergitol" 15-S-9, sold by Union Carbide Corporation. This surfactant contains from 11 to 15 carbon atoms per molecule of aliphatic alcohol and, on average, 9 moles of ethylene oxide units per mole of alcohol.

The surfactants present in the supernate formed in the thermal concentration process are intrinsically valuable, but their recovery is difficult because their concentrations in the supernate are relatively low, especially for the more valuable surfactant, AMPFAk. Furthermore, the surfactants consist of molecules having more-or-less distinct polar and non-polar portions, so that they tend to "bridge" ordinarily immiscible media such as might otherwise be used for their separation, as, for example, by liquid-liquid extraction. In addition, both surfactants have pronounced, and generally undesirable, foaming tendencies, especially in aqueous media.

Despite these difficulties, recovery of the surfactants is desirable because the disposal of the supernate by acceptable means is difficult. Ethoxylates, represented by "Triton" X-100, though considered biodegradable, degrade only slowly, even by bacteria acclimated to feeding upon it, and AMPFO is not biodegradable, nor is PTFE. The foaming tendency of the supernate can also pose troublesome problems in its disposal.

A known method for recovering "Triton" X-100 from dilute aqueous solutions in the concentration range typical of that found in supernate is to take advantage of the "inverse" solubility—temperature relationship found in the "Triton"—water system. Thus, such solutions, homogeneous at room temperature, can simply be heated to temperatures between the cloud (ca. 70° C.) and normal boiling points (ca. 100° C.) to effect a separation into two liquid phases, one rich in "Triton" and the other poor in "Triton". However, the basic effect of AMPFAk on the "Triton"—$H_2O$ system is to promote compatibilization of these components; i.e., to increase their miscibility. Thus, the effect of the presence of AMPFAk is to increase both the solubility of water in the "Triton"-rich phase, and the solubility of "Triton" in the water-rich phase; the cloud point (the temperature at which miscibility becomes limited) is raised as a result. AMPFAk, at the concentration level at which it is normally present in supernate, prevents a phase separation from being obtained by simply heating the supernate to a temperature up to as much as about 10° to 20° C. above that used in the thermal concentration of PTFE dispersion (but below the normal boiling point of the supernate).

Another limitation of this "thermal" phase-separation method is that, in the case where AMPFO (or its corresponding acid, usually designated C-8 acid) is present, the fluorosurfactant does not become well separated from the nonionic surfactant, even if phase separation does occur. On the contrary, the usual tendency is for the majority of the fluorosurfactant present to remain in the phase which is richer in the nonionic surfactant.

Various other recovery procedures have been devised. The use of ion-exchange for the recovery of fluorinated surfactants from aqueous media has been disclosed in the patent literature, as, for example, in U.S. Pat. No. 3,882,153, and more recently in U.S. Pat. No. 4,282,162. However, the treatment of the above-described supernate by ion exchange, using the same resin ("Lewatit" MP-62, a weakly basic anion exchanger sold commercially by Bayer AG) predominantly employed in the Examples of U.S. Pat. No. 4,282,162, and following the absorption and elution procedures of that patent (using an aqueous HCl/n-propanol mixture for elution), did not produce satisfactory long-term results. The ion-exchange resin on repeated use rapidly lost its capacity for AMPFO, so that after five cycles of use it retained only a small fraction of its initial capacity. The cause of this drop-off could not be readily ascertained. In addition to this major deficiency in performance, the ion-exchange resin is relatively expensive unless it can be reused many times, and the overall procedure is cumbersome for practical application. With the nonionic surfactant present, extensive washing and rinsing of the resin is necessary for its removal. Furthermore, the presence of the dispersed PTFE in supernate is also a potential source of fouling of the ion-exchange resin, and the other anionic components (besides AMPFO) present may be capable of reducing its exchange capacity for AMPFO.

It is desirable to provide a process for recovery of the surfactants discussed above which employs common, inexpensive inorganic reagents and a simple organic solvent, thereby avoiding the complexity of such techniques as ion exchange for effecting the separation of the surfactants, which overcomes foaming by appropriate choices of media and conditions, especially of pH level and which can be carried out at atmospheric pressure and at ambient temperature.

SUMMARY OF THE INVENTION

A process for separating the ammonium or alkali metal salt of a fluoroalkanoic acid having the general formula

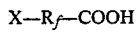

$X-R_f-COOH$ wherein $R_f$ is a saturated, perfluorinated linear or methyl-branched alkylene group containing from 5 to 10 carbon atoms and X is a member of the class consisting of hydrogen, fluorine or chlorine from a hydrocarbyl oxyethoxylated polyether having the general formula:

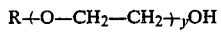

$R+O-CH_2-CH_2+_yOH$ where R is a primary or secondry alkyl group of from 11 to 18 carbon atoms or is

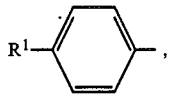

where $R^1$ is a primary, secondary, or tertiary alkyl group containing from 8 to 12 carbon atoms, and y is a number of from 8 to 14, from an aqueous mixture, which comprises:

A. extracting the salt (in the form of its corresponding acid) and the ethoxylated compound from an acidified aqueous mixture containing both by agitating the aqueous mixture with a chlorinated hydrocarbon organic liquid, and separating the organic liquid layer, B.(1) contacting said organic liquid layer with activated alumina and separating the organic liquid which contains the ethoxylated compound, and the alumina, which contains the acid, (2) contacting the alumina with ammonium hydroxide to remove said acid from the alumina, C. boiling the organic liquid obtained in step B1 until the ethoxylated compound remains.

DESCRIPTION OF THE INVENTION

The term PTFE as used herein means the homopolymer and copolymers where very minor amounts of comonomer units can be present.

A. Extraction Step (Step A)

In this step, both the ionic and nonionic surfactants are isolated from an aqueous dross liquor (this dross will be referred to hereafter as "supernate") by extracting them from the aqueous supernate into an chlorinated hydrocarbon organic liquid (any residual PTFE in the supernate precipitates and is collected).

Supernate obtained from the PTFE dispersion concentration method described in the BACKGROUND section is acidified to a low pH, e.g. below 7, preferably about 1-2, with an aqueous mineral acid (preferably sulfuric acid), and then agitated at room temperature for a short time in the presence of the chlorinated hydrocarbon preferably tri- or dichloromethane. The addition of the mineral acid converts the anionic surfactant (AMPFAk) from its ammonium salt to the corresponding carboxylic acid (perfluorooctanoic acid is representative and it is called "C-8" hereafter). Under these conditions, the PTFE present coagulates to form a non-dispersed solid phase, and the great bulk of both the nonionic and anionic surfactants is transferred into the organic phase. Separation of the two liquid phases is relatively sharp, and no foaming problem is encountered. Preferably, a second extraction is performed, conveniently using the same amount of organic liquid as before, on the aqueous layer after separation of the phases has been effected. The concentrations of both surfactants remaining in the aqueous phase after this second extraction are extremely low. After removal of dissolved, volatile organic liquid from the aqueous phase (where its concentration is only about 2 wt percent) by simple distillation (with the recovered organic liquid in the distillate being available for re-use in extraction) the aqueous layer, after neutralization with an appropriate reagent such as sodium hydroxide, lime, or limestone, can easily be disposed of. If desired, the organic liquid in the aqueous phase can also be recovered by "salting out" at room temperature, through saturation of this phase with sodium chloride or the like.

The coagulated PTFE, which tends to collect at the liquid-liquid interface after the first extraction, settles out almost completely in the organic phase after the second extraction. It can readily be removed from this phase by filtration, or simply by collection on a fine-mesh screen.

If the supernate is not acidified prior to extraction, emulsification tends to occur, and the foaming tendency remains high. Furthermore, the PTFE does not coagulate on extraction.

Trichloromethane can be used instead of dichloromethane as extracting agent, and is about equally effective. Both these extractants are essentially non-flammable. Although trichloromethane has some advantages over dichloromethane in having lower mutual solubility in and for water, and in being less volatile at room temperature, dichloromethane is preferred because it has a ten-fold higher Allowable Exposure Limit, as prescribed by the American Conference of Governmental and Industrial Hygienists.

It is well known that, by appropriate design of process vessels and exhaust ducts, vapors evolved by dichloromethane (or trichloromethane) during the operation of processes in which these compounds are used can be conducted to beds of activated carbon for trapping, and, if desired, subsequent recovery.

Surprisingly, it was found that use of dichloromethane to extract perfluorooctanoic acid (C-8) from the mixture obtained when sulfuric acid was added to a solution of AMPFO in water (i.e., with no "Triton" present) was not effective. When shaken, the contents of the separatory funnel in which the extraction was carried out became very foamy, filling the funnel completely, even though the total liquid volume initially charged (aqueous phase, plus 20% by volume $CH_2Cl_2$) was less than one quarter the empty volume of the funnel. Titration (with standard NaOH solution) of the upper (aqueous) and lower (organic) layers obtained after a 20-minute standing period indicated that the C-8 acid had by no means been effectively removed from the aqueous phase.

Also surprisingly, the halocarbon liquid 1,1,2-trichloro-1,2,2-trifluoroethane (FREON ® 113) was not found suitable as an extractive agent for supernate, whether the latter was in either an alkaline or acidic condition. The major advantages of excellent separation with little or no foam formation provided by the dichloromethane and trichloromethane extractants were found lacking with the chlorofluorocarbon compound.

While AMPFO is essentially insoluble in an aromatic liquid such as toluene at ordinary temperatures, whereas "Triton" X-100 is miscible in all proportions with toluene, attempts to separate solutions of AMPFO in "Triton" X-100 by addition of toluene were found unavailing. The same was true when the AMPFO was present in the form of its corresponding acid, C-8, (through mineral acid addition), rather than the ammonium salt.

Advantages of this extraction method (over the "thermal" phase-separation method) of separating the nonionic ethoxylated surfactant and the AMPFAk from (acidified) supernate are as follows:

1. The concentration of residual ethoxylated surfactant in the aqueous phase is significantly lower when extraction (especially the preferred two-step extraction) is used. Furthermore, when AMPFAk is present, its effect in the "thermal" method is to increase this concentration of residual ethoxylated surfactant in the aqueous phase. While this solubilizing effect can be offset by addition of electrolytes such as sodium chloride, the aqueous effluent to be disposed of then contains an additional component.

2. The extraction method effects a coagulation of the PTFE solids dispersed in supernate, thereby facilitating their easy removal. With the "thermal" method, this PTFE remains dispersed.

3. The extraction method can conveniently be carried out at room temperature.

4. In the extraction method, nearly all of the AMPFAk is extracted into the organic solvent layer with the ethoxylated surfactant, and very little water is present in this phase. Evaporation of the low-boiling solvent (after adsorption of the acid form of the AMPFAk onto alumina) gives a highly concentrated ethoxylated surfactant residue. In the "thermal" method of separation, the ethoxylated surfactant-rich phase contains about 33 or more percent water, especially if AMPFAk is present or if the separation is carried out below the normal boiling point of about 100° C.

5. Presence of AMPFAk prevents use of the usual phase-separation procedure employed to isolate the ethoxylated surfactant from water.

B. Adsorption/Desorption Step (Using Alumina)

In this step the ionic surfactant is removed from the organic liquid by adsorption on alumina, leaving the nonionic surfactant in the organic liquid.

The organic extract from A above, which typically contains 10–20 wt. % of nonionic hydrocarbyl oxyethoxylated surfactant and about 0.4–0.8 wt. % of anionic perfluorinated alkanoic acid surfactant, represented by C-8, is contacted with activated alumina, preferably in granular form, at room temperature under conditions of mild agitation. A commercial grade of alumina containing particles in the 8–14 mesh range is representative. To insure activity, the alumina may be heated to about 220° C. for 2–4 hours in an air oven prior to use, and then protected from contact with moist air during and after cooling to room temperature.

The alumina serves to remove the perfluorinated alkanoic acid from the organic supernate extract liquid by adsorption. If the nonionic surfactant is to be re-used neat for the thermal concentration of raw PTFE dispersion (after recovery from the organic extract), it is necessary to reduce the concentration of residual alkanoic acid in it to about 0.5 wt. % or below; otherwise, the cloud point of the system is altered, and thermal concentration behavior and performance are adversely affected. With mild agitation under room temperature conditions in the adsorption step, it has been found possible to reduce the proportion of alkanoic acid to nonionic surfactant to the above level in a matter of a few hours when 80–120 grams of alumina are used per liter of extract. Longer contacting times provide a greater degree of adsorption of the anionic surfactant, as does more vigorous agitation; however, the latter alternative can lead to an undesirable degree of mechanical attrition of the adsorbent.

Alumina suitable for use in the adsorption/desorption step is of the type available commercially under the familiar designation "activated alumina". As a general rule, the smaller the particle size of the alumina granules (and the correspondingly greater (external) surface area per unit of weight), the more rapidly both adsorption and desorption tend to occur. On the other hand, small particle size tends to increase the loss of adsorbent through dissolution, mechanical losses, and the like. A size fraction of granules between 8- and 14-mesh screen size has been found to provide a good balance between these abovementioned effects, but is not essential for commercial utility or suitability.

The liquor in contact with the alumina is drained off when the contacting period is terminated, and the alumina washed with fresh dichloromethane or trichloromethane to remove residual nonionic surfactant as completely as possible. The washings can be added to the alumina-treated extract. A portion of the nonionic surfactant, typically equal to about half the weight of adsorbed anionic surfactant, appears to be tightly enough adsorbed on the alumina so as not to be readily removable by washing.

The dichloromethane or trichloromethane remaining on the alumina after draining of the washings can be vaporized off with air (or nitrogen) and passed through a standard activated carbon adsorber unit for trapping (and, if desired, later recovery) of the organic liquid.

To recover the alkanoic acid from the alumina, the dried alumina from the adsorption step is contacted with aqueous ammonia at room temperature, again with mild agitation. The ammonia converts the adsorbed alkanoic acid to its ammonium salt (AMPFAk), which then desorbs from the alumina. Residual nonionic surfactant also is removed from the alumina by this treatment. By using an appropriate concentration of $NH_4OH$ (typically, about 1.5N), it is possible to effect nearly complete desorption in a matter of a few hours, using 3-5 liters of $NH_4OH$ per kilogram of solid. Use of higher concentrations or of somewhat elevated temperatures will accelerate the desorption, but is apt to cause an undesirable degree of attrition of the alumina granules. Mild agitation is preferred, not only to minimize such attrition, but also to avoid an undesirable degree of foam formation.

After the aqueous liquor has been drained from the alumina at the end of the contacting period, the alumina can be washed under mild agitation for a short period with fresh 1.5N $NH_4OH$ and then with demineralized water, with these washings being added to the main desorption liquor The alumina can then be regenerated for adsorptive use by the same air-oven treatment described earlier. Tests have shown that the recovered alumina retains its effectiveness as adsorbent after five or more repeat cycles of such use. The overall consumption per cycle (based on use of fresh alumina) is of the order of 15 percent.

If the desorption liquor is allowed to stand at room temperature for an extended period of time without neutralization, a white solid gradually settles out. Analysis shows this precipitate to be hydrated aluminum oxide. While it can be filtered off without difficulty, it is desirable instead to prevent its formation by acidification of the desorption liquor shortly after desorption is completed.

C. Solvent Evaporation Step

The organic liquid remaining after the adsorption step can simply be boiled at atmospheric pressure to evaporate off the residual dichloromethane solvent or trichloromethane, thereby leaving the neat hydrocarbyl oxyethoxylated surfactant (containing 0.5 wt % less of alkanoic acid) available for re-use in the thermal concentration of PTFE dispersion. The evaporated $CH_2Cl_2$ or $CHCl_3$ is condensed for re-use in the extraction step. In large-scale operation, the yield of recovered nonionic surfactant approaches 98 percent.

In case the organic liquid remaining after the adsorption step is not water-white, it has been found possible to remove the color effectively by conventional treatment at room temperature with low levels of activated carbon adsorbents, such as charcoal of the commercially available "Darco" brand. The carbon is filtered off after a short mixing and contacting period, leaving the liquid essentially water-white. The loss of nonionic surfactant in this additional treatment step is very small.

ANALYTICAL METHODS

Analytical methods used in the Examples consisted of the following:

For AMPFO, a modification of the colorimetric extractive procedure for analysis of anionic surfactants, as described in the "Encyclopedia of Industrial Chemical Analysis", Vol. 1, pp. 339–40, Interscience Publishers, New York, N.Y. (1971), was used. The method involves the use of a cationic blue dye (such as methylene blue or Azure A) to form an extractable blue complex which has an absorbance peak in the visible region at about 635 nm. Appropriate sample dilutions were used to obtain peak absorbance values in the range between 0 and 1, and "blank" corrections were applied. At low to moderate ratios of "Triton" X-100 to AMPFO, the "Triton" X-100 nonionic surfactant gives little or no interference. To analyze samples in which higher ratios were present, the sample was first steam distilled at atmospheric pressure in the presence of dilute aqueous phosphoric acid. The acid converts the AMPFO to its corresponding acid, C-8, which steam distills away from the "Triton" X-100 and can be measured in the distillate by the colorimetric procedure. Traces of "Triton" X-100 in the distillate do not interfere. Distillation was continued until the level of AMPFO coming over was insignificant.

For "Triton" X-100 in aqueous solution, analyses were performed by measurement of peak absorbance in the ultraviolet region at a wavelength of about 275 nm. Appropriate dilutions were used to bring the peak absorbance values into the 0–1 range, using a 1-cm path length.

Samples which contained dichloromethane were purged of this solvent by evaporation into a stream of nitrogen gas prior to analysis or to steam distillation.

Acid-base titrations were made using either phenolphthalein or screened methyl orange as indicators, or by potentiometric (pH) measurement when appropriate.

EXAMPLE

In the Example which follows, all proportions are expressed on a weight basis, unless otherwise specified. Concentrations of the AMPFO fluorosurfactant are expressed in terms of equivalent AMPFO, whether this compound is present in any given stage of the overall recovery process as the ammonium salt or as the corresponding acid (1 g AMPFO $=414/431=0.961$ g $C_7F_{15}COOH$).

A. Extraction Step

Into a Squibb-type, glass separatory funnel having a nominal capacity of 3000 ml (actual capacity of 4300 ml) was placed, at room temperature, 2000 ml (2.006 kg) of supernate which had been decanted after commercial-scale thermal concentration of raw PTFE dispersion. The supernate contained 5.92 wt. % "Triton" X-100 and 0.212 wt. % of AMPFO, and sufficient ammonium hydroxide to give a pH between 9 and 10. 18 ml (25 g) of 50 wt. % aqueous $H_2SO_4$ was added, followed by 400 ml (529 g) of reagent-grade dichloromethane. The mixture in the funnel was shaken vigorously by hand for about one minute. The amount of foaming which occurred on shaking was negligible. After about a one-half hour settling period, the lower (organic) layer (440 ml; ca. 560 g) was withdrawn, followed by a small interfacial layer consisting of a slurry (16 ml) of coagulated PTFE polymer in the organic phase. The upper (aqueous) layer (ca. 1988 ml) was found to contain only 0.0076 wt % (76 ppm) of "Triton" X-100 and only 0.0022 wt. % (22 ppm) of (equivalent) AMPFO. The (equivalent) AMPFO content of the organic layer was found to be a 0.75 wt. %.

The aqueous residue was then extracted in a similar manner with a second 400 ml portion of dichloromethane at room temperature. The lower layer withdrawn after the extraction (372 ml; 490 g) had an (equivalent) AMPFO content of 0.060 wt. %. The upper layer had a volume of about 1986 ml and contained only 8 ppm and only 20 ppm of "Triton" X-100 and (equivalent) AMPFO, respectively. By distillation and condensation, the dichloromethane content of this layer was found to be about 1.6 wt. %. The acid content of this layer was found by titration with sodium hydroxide to a phenolphthalein endpoint to be about 0.06 g-equivalents per liter.

The low concentrations of "Triton" X-100 and APFO in the aqueous layer after either extraction show that both of these components can be removed to the extent of 99% or more from supernate by extraction.

In subsequent experiments on the same scale the interfacial layer was not withdrawn after the first extraction. Instead, by waiting until the second extraction was complete, virtually all of the coagulated PTFE settled to the bottom of the lower layer, and was thus readily withdrawn first from the separatory funnel. In addition, subsequent experiments on the same scale in which fresh portions of supernate were successively extracted with fresh portions of dichloromethane without cleaning the funnel between extractions showed that the fraction of the total extracted "Triton" X-100 and C-8 acid lost as a residue held on the walls of the funnel became significantly less than in a single double-extraction test. (This residue could, of course, also be removed by rinsing of the funnel with fresh dichloromethane after extraction, at the expense of (slight) dilution of the extracts.)

The coagulated PTFE recovered from the extraction step was easily removed from its slurry in dichloromethane by straining through a fine metal screen. While the level of dispersed PTFE in supernate tends to be variable depending on thermal concentration performance, it typically amounts to only 0.1 to 0.5 wt %.

Very similar results were obtained in smaller-scale tests in which trichloromethane was used instead of dichloromethane as extractant.

B. Adsorption/Desorption Step

To a 500 ml (647 g) aliquot of the combined first and second dichloromethane extracts described above contained in a stoppered glass flask at room temperature was added 20.0 g of activated alumina. The alumina, sold commercially by Matheson, Coleman and Bell Incorporated as chromatographic grade, 80–200 mesh, Order No. AX0612, had been screened on a 140-mesh screen to remove fines, and then heated in an air oven for 4 hours at 260° C. about two weeks prior to use. (The alumina was protected from contact with atmospheric moisture during this two week period.) The slurry of alumina in the extract was occasionally shaken vigorously over a period of about three hours and then allowed to stand for a period of about 64 hours at room temperature. The liquid (ca. 480 ml) was then carefully decanted from the solid, and contacted in a similar manner to that above (except for reduction of the standing period to about 24 hours) with a second 20.0-g portion of fresh alumina of the same type as before. At the end of the standing period, the liquid was again carefully decanted from the solid. The measured concentrations of (equivalent) AMPFO in the first and second liquids recovered after adsorption were 0.054 wt. % and 0.007 wt %, respectively. The calculated levels of (equivalent) AMPFO captured on the adsorbent were 0.115 and 0.017 g/g, respectively.

The amount of "Triton" X-100 remaining in the 500 ml aliquot of the combined dichloromethane extracts was calculated to be about 73 g, or 11.3 wt %. Hence the concentration of (equivalent) AMPFO, based on "Triton" X-100 (i.e., on a dichloromethane-free basis), remaining in the liquid after the first adsorption with alumina was 0.054/0.113=0.48 wt %. "Triton" X-100 containing even somewhat over 0.5 wt % AMPFO can be re-used successfully for the thermal concentration of PTFE dispersion under normal conditions.

It was found that washing of the recovered alumina with relatively small quantities of fresh dichloromethane would reduce this ratio of "Triton" X-100 to AMPFO on the alumina to ½ to 1, without significantly removing any of the adsorbed fluorosurfactant. At the ½ to 1 ratio, both surfactants are apparently present on the alumina in an adsorbed condition.

The alumina used for the above adsorption tests was considered to be too finely divided to be well suited to commercial-scale use. Accordingly, a group of four other types of larger particle size (up to about ⅛ inch) was evaluated. While most of these showed approximately comparable saturation adsorptive capacity for the alkanoic acid fluorosurfactant (about 0.2 g/g) after prolonged contact, the most suitable candidate from an overall standpoint of capacity, rapidity of adsorption, and particle size appropriate for large-scale operation was an 8–14 mesh screen fraction of activated alumina sold commercially by Matheson, Coleman and Bell, Incorporated under the designation of Order No. AX06010. With this candidate (after activation by heating in an air oven for 10 hours at 220° C.), it was found that 85% or more of the (equivalent) AMPFO typically present in the dichloromethane extract of supernate could be adsorbed, in a single contacting under conditions of mild agitation at room temperature and at an adsorbent loading of 100 g per liter of extract, in a period of about 4 hours. This degree of reduction in the level of residual APFO in the dichloromethane extract brought the weight ratio of AMPFO to "Triton" X-100 low enough (i.e., about 1 to 200) for the "Triton", after evaporation of the dichloromethane solvent, to be directly reusable for the thermal concentration of PTFE dispersion.

For the desorption of C-8 acid adsorbed on alumina (MC&B, Type AX0610), ammonium hydroxide solution was used. It was found that nearly complete removal of the fluorosurfactant, in the form of an alkaline solution of its ammonium salt, could be conveniently achieved at room temperature, under conditions of mild agitation, in a period of two hours or less when 1.5N aqueous NH$_4$OH was used, at a level of 0.4 liter of liquid per 100 g of solid. The same degree of desorption could be achieved more rapidly by use of higher temperature, higher solution concentration, or more vigorous agitation, but at the expense of increased attrition of the alumina particles. A preferred desorption procedure is: To a spherical glass 1-liter "Morton" -type flask, having four deep "creases" in its walls and mounted such that it could be rotated about its central axis at an angle of about 30° to the horizontal, was charged 100 g of alumina which had been used to adsorb perfluorooctanoic acid (C-8) from a dichloromethane (single-fold) extract of supernate. The alumina, which had been separated from the extract, then washed with fresh dichloromethane, and dried by evaporation of residual solvent into a stream of nitrogen at room temperature, contained about 7 g of (equivalent) APFO and about 3.5 g of "Triton" X-100 adsorbed on its surface. A 400-ml quantity of 1.5N NH$_4$OH solution was then added, and the flask was rotated at about 20 to 30 RPM for a period of 1 hour. While some foam was produced during this period as desorption occurred, it neither filled the freeboard of the flask, nor posed any handling problems. The liquid was then decanted and drained from the solid, and a 150-ml portion of fresh 1.5N NH4OH solution was added to the wet solid in the flask. Rotation at the same rate as before was begun, and continued for 10 minutes. The liquid was decanted and drained as before. A 125-ml quantity of demineralized water was then added to the wet solid in the flask, which was then rotated at the same speed as before for another five minutes. A second demineralized water wash was then carried out under the same conditions as the first.

The water-wet alumina remaining after desorption was set out to dry at room temperature, and later reactivated by heating for 10 hours at 220° C. in an air oven. The overall weight loss of the alumina across this (first) adsorption/desorption cycle was about 15 percent. Subsequent experience has shown that the alumina still remains active after 5 or more such cycles.

C. Solvent Evaporation Step

To a conventional laboratory glass distillation assembly, consisting of a 500-ml round-bottom, long-necked flask, a distilling head provided with a sidearm and a thermometer, a straight-tube condenser having a 25-cm long jacket for cooling water, a take-off adapter and graduated cylinder receiver, was charged 248.6 g (ca. 192 ml) of the dichloromethane extract of supernate which had been twice contacted with activated alumina, as previously described. An atmospheric pressure steam bath was used to supply heat for the distillation. Alumina granules were added to the distilling flask to promote smooth boiling.

Distillation was continued until after the contents of the flask had ceased to boil. No foaming problem was encountered. A total of 215.6 (164.5 ml) of distillate was collected, which appeared to be nearly pure dichloromethane plus a small amount of water. The residue in the flask (primarily "Triton" X-100) weighed 30.4 g, and had some odor of residual dichloromethane. After blowing a slow stream of dry nitrogen into the flask for 30 minutes, the weight of the residue, which was now virtually free of this odor, was 29.4 g. The residue gave a neutral reading with pH paper. The calculated overall in-hand yield of recovered "Triton" X-100 was about 90%. The recovered "Triton" gave equivalent performance to fresh "Triton" in the thermal concentration of PTFE dispersion.

In some cases, the recovered "Triton" was found to have a very light brown color, distinguishable from fresh "Triton", which is nearly water-white. The possible source of this brownish tint has been alluded to previously. It was found that a color can be virtually all removed by treating the dichloromethane extract, after alumina treatment, with activated carbon (a charcoal, of 20- to 40- mesh size) such as "Darco" for one hour at room temperature with mild agitation, using a loading of 13 g of carbon per kg of extract. The spent carbon is then filtered off for washing and disposal, and the remaining extract (and washings) distilled to recover both "Triton" and dichloromethane, as described earlier.

We claim:

1. A process for separating a fluoroalkanoic acid having the general formula

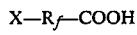

wherein $R_f$ is a saturated, perfluorinated linear or methyl-branched alkylene group containing from 5 to 10 carbon atoms and X is a member of the class consisting of hydrogen, fluorine or chlorine from a hydrocarbyl oxyethoxylated polyether having the general formula:

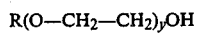

where R is a primary of secondary alkyl group of from 11 to 18 carbon atoms or is

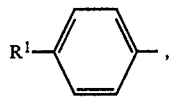

where $R^1$ is a primary, secondary, or tertiary alkyl group containing from 8 to 12 carbon atoms, and y is a number of from 8 to 14, when both are present in an organic liquid selected from dichloromethane or trichloromethane, which comprises:

(1) contacting said organic liquid with activated alumina and separating the organic liquid from the alumina, (2) washing and drying the alumina and contacting it with ammonium hydroxide whereby the ammonium salt of the fluoroalkanoic acid is removed from the alumina, (3) boiling the organic liquid obtained in step (1) until the ethoxylated compound remains.

* * * * *